Jan. 25, 1927.
H. DEL MAR
1,615,536
PIPE JOINT UNION
Filed June 29, 1923
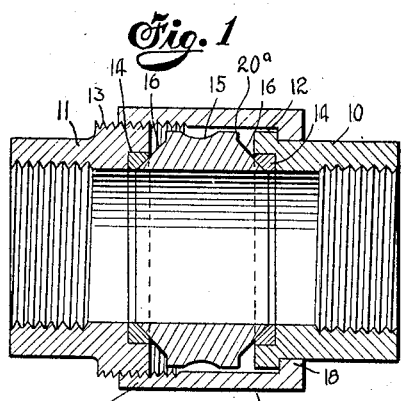
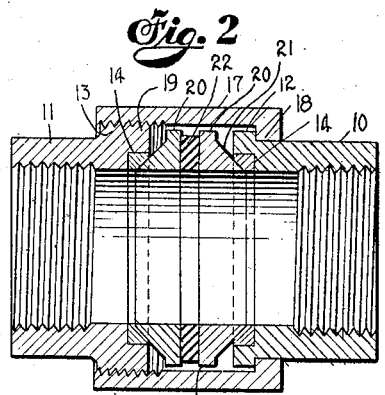
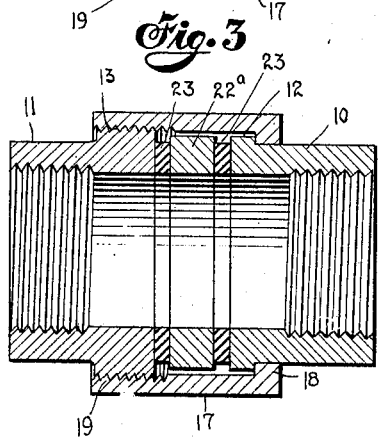
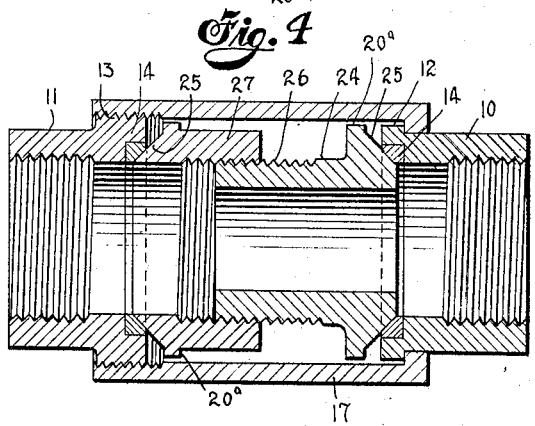
INVENTOR
HARRY DEL MAR
BY
*W. B. Hutchinson*
ATTORNEY Patented Jan. 25, 1927.

1,615,536

UNITED STATES PATENT OFFICE.

HARRY DEL MAR, OF NEW YORK, N. Y.

PIPE-JOINT UNION.

Application filed June 29, 1923. Serial No. 648,501.

My invention relates to improvements in pipe joints and unions, and the object of my invention is to produce a simple, inexpensive, and efficient pipe joint union applicable to connecting the adjacent ends of pipes, and particularly pipes adapted to carry pressure. My invention is intended to produce a structure which has one or more intermediate joints of metal either ground to a smooth finish to make a tight joint without washers, or rough faces joined together by washers. Further my invention is adapted for either the nut or flange type of joint. A particular object of my invention is to produce a structure of this kind which will be absolutely tight, and which can be used as an extension between the adjacent ends of pipes so that the pipe ends can be coupled together perfectly, but in a manner to prevent any strain and to facilitate expansion and contraction without injury to the joint. A common practice is to bring the adjacent ends of meeting pipes fairly close together but at an angle to the general line of the pipes, and then swing them together somewhat after the manner of operating a toggle joint, and this brings them together under strain, which is further increased by the contraction or expansion of the joint as the case may be, and ultimately results in leakage. In carrying out my invention, I use in some of the forms shown, concave and convex meeting parts, one being harder than the other, and I am aware that this is not new, as the structure has been used in couplings, valves, and the like; but my invention is not confined to this structure, and in any event it includes the use of a connector or extension by which the pipe ends may be united readily, tightly, and without strain. This will be better understood from the description which follows.

Reference is to be had to the accompanying drawings forming a part of this specification, in which similar reference characters indicate corresponding parts in all the views.

Figure 1 is a longitudinal section of a simple form of the pipe joint union.

Figure 2 is a similar view showing a slight modification.

Figures 3 and 4 are longitudinal views showing other modifications of the invention.

By way of example I have shown several forms of my improved pipe joint to make it clear that the invention is not confined to one particular joint, but includes various ways of placing an extension between the pipe ends to be united, and fastening the parts in a way to make a tight strong joint without strain. In the simple form shown in Figure 1 are illustrated two thimbles 10 and 11, internally screw threaded to connect in the ordinary screw manner to pipe ends, and one of these thimbles is provided with a terminal circumferential flange 12, and the other with an external thickened and threaded portion 13. The thimbles as shown in Figure 1 have seats 14 of softer metal or of softer material, which are concave on the outer sides so as to permit the extension 15 to have its convex end portions 16 seat snugly on the members 14, and thus make a tight joint. It will be seen that this structure permits of a certain amount of elasticity as the meeting pipes can bend more or less with relation to each other without straining the joint, as the meeting parts 14 and 16 will rock to permit such action, and the flanges 20$^a$ on the extension will prevent the rocking from proceeding too far. The extension 15 may be a comparatively short member, or it may be in the form of a pipe of substantial length if desired, and the joint is finished and held tight by the sleeve 17 which is a common form of nut connection having an inturned flange 18 to fit over and abut with the flange 12, and an internal screw thread 19 to engage the screw thread 13. It will be seen that by tightening the sleeve 17 that is screwing it on the part 13, the members 10 and 11 will be drawn towards each other, and the parts 14 and 16 drawn tightly together to make a tight joint. It will be further observed that this construction, as to the several other forms illustrated, obviates the necessity of springing the pipe ends together, but if they are approximately together and in alignment, the joint will do the rest, and the parts 15 and 17 can be made of a length to make the connection between the opposed pipes without trouble and without strain.

In Figure 2 I have shown the same idea but carried out in a slightly different way to fit different conditions. As here illustrated, instead of the single member 15, I use opposed members 20, each having a convex part 21 to fit against the seat 14, and each having the flange 20$^a$ above referred to. These separate members 20 take the place of a single member 15, and have flat inner ends adapted to fit against a washer 22, which can be of soft metal or other soft material, so that the joint will be perfectly tight. Obviously this washer 22 can be of any necessary length, and it will be seen that because of the different degrees of hardness of the washer and its abutting parts, the joint can be made perfectly tight, while the engaging convex and concave surfaces at the ends of the joint permit the necessary elasticity.

In Figure 3 I have shown the washer 22$^a$ in the form of a short pipe, and of relatively hard material, while two washers 23 of soft material are interposed between the members 22$^a$ and the thimble ends, the parts being united by the screw 17 as already described. For perfectly straight work and where there is no tendency to rock, this joint answers every purpose, and is smooth and tight, the extension member 22$^a$ serving the purpose of filling the space between the thimble ends or pipe ends, and as stated, this can be of any necessary length.

Figure 4 illustrates another way of forming the joint with a substantial extension, which extension has the advantage of being adjustable to quite a large extent. In this case a hollow member 24 is provided with a convex end 25 to seat against the member 14, and with the shoulder or flange 20$^a$ referred to, this member 24 being screw threaded as shown at 26, to enter an internally threaded member 27 which has a convex construction 25 at the end, and the flange 20$^a$ already referred to. The connecting sleeve 17 is used here as in the other cases, and it will be seen that a tight joint is easily made, and that the extension member, which in this case comprises the parts 24 and 27, can be adjusted to span the gap between the pipe ends or thimble ends.

The above illustrations serve to bring out the fact that the invention is not limited to a particular type of extension between the pipe ends.

I claim:—

A pipe joint and union comprising opposed thimbles having means for attachment to adjacent pipe ends, a longitudinally extensible tubular element or filler filling the space between the thimble ends, concavo-convex seats at the abutting portions of the filling element and the thimbles, and means for drawing the thimbles towards each other thereby tightening the seats.

HARRY DEL MAR.